US009065832B2

(12) United States Patent
Barzily et al.

(10) Patent No.: US 9,065,832 B2
(45) Date of Patent: Jun. 23, 2015

(54) METHOD AND APPARATUS FOR AUTOMATED NETWORK CONNECTIVITY FOR MANAGED APPLICATION COMPONENTS WITHIN A CLOUD

(71) Applicants: Sivan Barzily, Tel Aviv (IL); Islam Heralla, Kufur (IL)

(72) Inventors: Sivan Barzily, Tel Aviv (IL); Islam Heralla, Kufur (IL)

(73) Assignee: Alcatel Lucent, Boulogne-Billancourt (FR)

( * ) Notice: Subject to any disclaimer, the term of this patent is extended or adjusted under 35 U.S.C. 154(b) by 252 days.

(21) Appl. No.: 13/741,067

(22) Filed: Jan. 14, 2013

(65) Prior Publication Data
US 2014/0201379 A1    Jul. 17, 2014

(51) Int. Cl.
*H04L 29/06*    (2006.01)
*H04L 29/08*    (2006.01)

(52) U.S. Cl.
CPC .......... *H04L 67/101* (2013.01); *H04L 67/1002* (2013.01)

(58) Field of Classification Search
USPC .......................... 709/228, 226, 219, 235, 245
See application file for complete search history.

(56) References Cited

U.S. PATENT DOCUMENTS

| 8,892,766 | B1 * | 11/2014 | Wei et al. | 709/235 |
|---|---|---|---|---|
| 2004/0032429 | A1 * | 2/2004 | Shah et al. | 345/771 |
| 2011/0029461 | A1 * | 2/2011 | Hardin, Jr. | 705/412 |
| 2012/0047286 | A1 * | 2/2012 | Ke | 710/7 |
| 2012/0137313 | A1 * | 5/2012 | Kannoori et al. | 719/328 |
| 2013/0138619 | A1 * | 5/2013 | Krislov | 707/695 |
| 2013/0166962 | A1 * | 6/2013 | Branson et al. | 714/47.3 |

* cited by examiner

*Primary Examiner* — Jude Jean Gilles
(74) *Attorney, Agent, or Firm* — Kramer & Amado, P.C.

(57) ABSTRACT

Various exemplary embodiments relate to a method performed by an application manager for automatically establishing a network connection between components of an application within a distributed cloud, the method including: establishing application components in the distributed cloud; selecting a first application component; identifying network characteristics from the network policy file associated with the first application component; determining a network connection between the first application component and a second application component according to the network characteristics associated with the first application component; associating the network connection with the first application component; and establishing the network connection between the first and second application components.

20 Claims, 4 Drawing Sheets

500 # METHOD AND APPARATUS FOR AUTOMATED NETWORK CONNECTIVITY FOR MANAGED APPLICATION COMPONENTS WITHIN A CLOUD

TECHNICAL FIELD

Various exemplary embodiments disclosed herein relate generally to cloud computing.

BACKGROUND

Distributed data center architectures provide a larger number of data centers that may be geographically distributed. The data centers may remain under the control of one or more cloud controllers through a network such as the Internet or carrier networks. Under such a distributed system, various components of a cloud application may be distributed across different data centers. An application manager may allocate and manage these application components. For example an application may need access to a private database that might be located at a private data center, accordingly components of the application may include a database and a backend server for securely accessing the database. The application manager needs to connect these various application components together over network connections. In some known system, such connections are supplied by an application provider, but the application provider may not have access to or the needed information to access certain private connections and networks. Further, the owner of private networks and data may desire to limit access to their networks and hence may not grant wide access to application providers. Accordingly, there remains a need for such connections to be made automatically by the application manager which a private network owner may trust.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by an application manager for automatically establishing a network connection between components of an application within a distributed cloud, the method including: establishing application components in the distributed cloud; selecting a first application component; identifying network characteristics from the network policy file associated with the first application component; determining a network connection between the first application component and a second application component according to the network characteristics associated with the first application component; associating the network connection with the first application component; and establishing the network connection between the first and second application components.

Various embodiments described herein relate to an application manager for automatically establishing a network connection between components of an application within a distributed cloud. The application manager includes: a data storage and a processor in communication with the data storage. The processor is programmed to: establish application components in the distributed cloud; select a first application component; identify network characteristics from the network policy file associated with the first application component; determine a network connection between the first application component and a second application component according to the network characteristics associated with the first application component; associate the network connection with the first application component; and establish the network connection between the first and second application components.

Various embodiments described herein relate to a non-transitory machine-readable storage medium encoded with instructions for execution by an application manager for automatically establishing a network connection between components of an application within a distributed cloud, the medium including: instructions for establishing application components in the distributed cloud; instructions for selecting a first application component; instructions for identifying network characteristics from the network policy file associated with the first application component; instructions for determining a network connection between the first application component and a second application component according to the network characteristics associated with the first application component; instructions for associating the network connection with the first application component; and instructions for establishing the network connection between the first and second application components.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
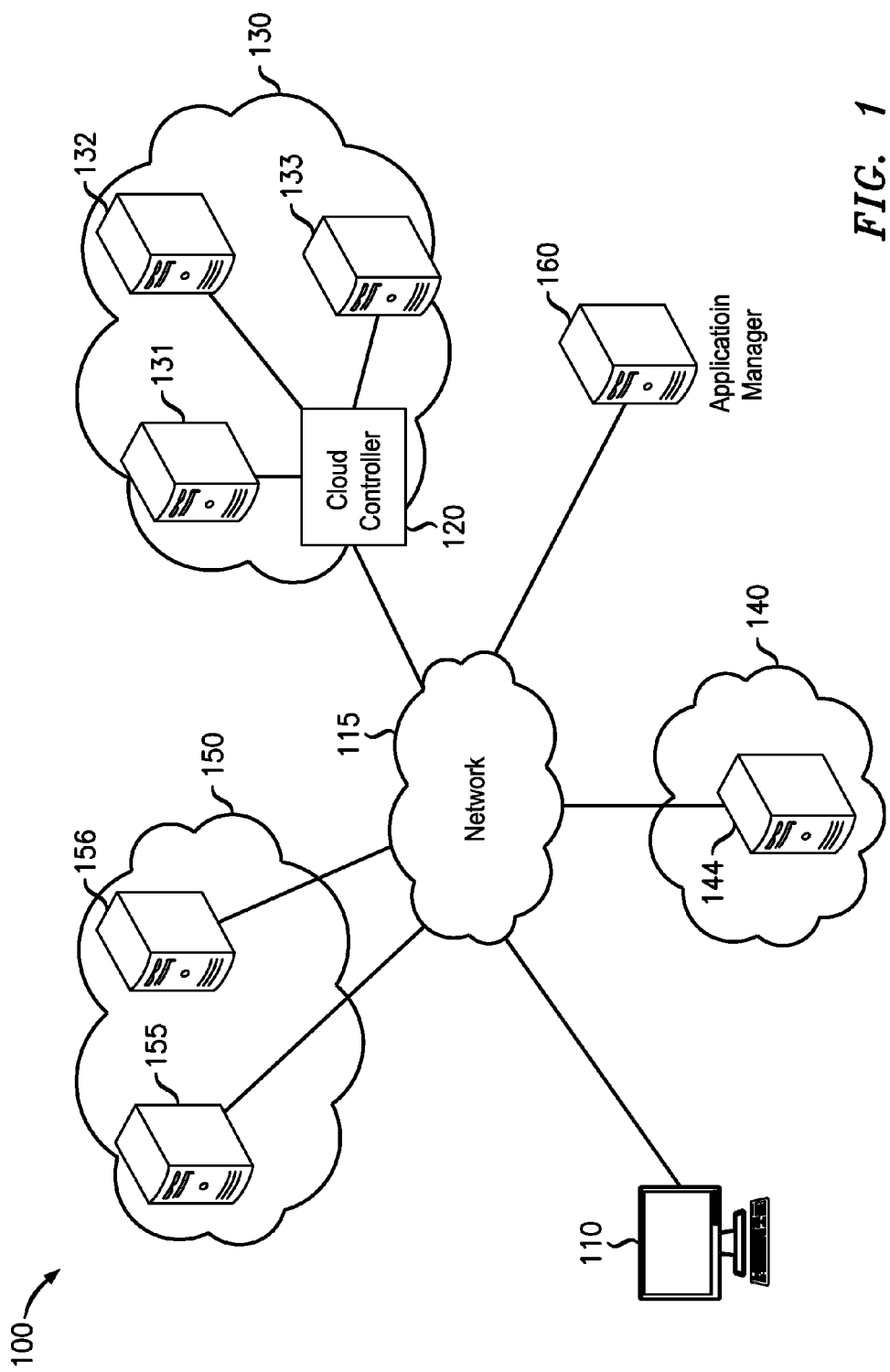
FIG. 1 illustrates an exemplary network for providing cloud resources.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

In accordance with the foregoing, various embodiments described herein enable a developer of a cloud application to specify network characteristics in order for an application manager to automatically interconnect application components. Various additional features and implementation details will be described in greater detail with respect to the figures below.

Referring now to the drawings, in which like numerals refer to like components or steps, there are disclosed broad aspects of various exemplary embodiments.

FIG. 1 illustrates an exemplary cloud architecture 100 for providing distributed cloud resources. The distributed cloud architecture 100 may implement a networked cloud architecture and may include a client device 110, a network 115, a cloud controller 120, data centers 130, 140, 150, and an application manager 160.

The client device 110 may be any device configured to utilize one or more cloud resources. In various embodiments, the client device 110 may be a desktop computer, laptop, tablet, mobile device, server, or blade. The client device 110 may communicate with other devices, such as the cloud controller 120, via the network 115. The client device 110 may transmit a request for one or more cloud resources to the cloud controller 120. For example, the client device 110 may request the use of one or more virtual machines (VMs), groups of VMs, storage devices, or memory. Additional types of cloud resources will be apparent. The client device 110 may represent a device of a user that requests the deployment of a distributed cloud application from the cloud controller 120 or the client device 110 may represent a customer of such a user that requests the use of one or more components of such a distributed cloud application by directly communicating with such resources 131, 132, 133, 144, 155, 156. It will be apparent that multiple additional client devices (not shown) may be in communication with the network 115 and such additional client devices may be associated with additional users and customers.

The network 115 may be any network of devices or transmission media capable of enabling communication between the various devices of the exemplary cloud architecture 100. For example, the network 115 may include numerous devices configured to exchange and route data packets toward various destinations. In various embodiments, the network 115 may include the Internet or one or more carrier networks. Further, private networks, for example virtual private networks, may also be connected between the network 115 and various resources 131, 132, 133, 144, 155, 156.

The cloud controller 120 may be a device configured to control the operations of a distributed networked cloud. The cloud controller 120 may include various hardware such as a storage device, memory, or one or more processors, as will be described in greater detail below with respect to FIG. 3. As used herein, the term "processor" will be understood to encompass a variety of devices such as microprocessors, field-programmable gate arrays (FPGAs), application-specific integrated circuits (ASICs), and other similar processing devices. In various embodiments, the cloud controller 120 may include, for example, a server, a blade, a personal computer, a laptop, a tablet, or a mobile device. In some such embodiments, the cloud controller 120 may be a virtual machine that utilizes cloud resources such as, for example, the hardware resources provided by cloud devices 131, 132, 133. The cloud controller 120 may reside at a data center, such as data center 130, or may reside elsewhere. The cloud controller 120 may perform various cloud management functions, including management of cloud resource allocation. As such, the cloud controller 120 may receive requests for the establishment of cloud applications from client devices such as the client device 110. Upon receiving such requests, the cloud controller 120 may allocate requested resources from one or more of the cloud devices 131, 132, 133, 144, 155, 156, for use by client devices. In various embodiments, the exemplary distributed cloud architecture 100 may include multiple cloud controllers (not shown). Various techniques for coordinating the operation of multiple cloud controllers will be apparent.

The data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. The data centers 130, 140, 150 may be geographically distributed or may be situated at different network distances from the client device 110. For example, the client device 110 may be located in Washington, D.C., data center 140 may be located in Chicago, data center 150 may be located in Paris, and data center 130 may be located in Tokyo. According to this example, the client device 110 may experience less network latency when communicating with data center 140 than when communicating with data center 130. It will be apparent that the cloud architecture 100 may include numerous additional data centers (not shown) and that each data center may include any number of cloud devices.

Each of cloud devices 131, 132, 133, 144, 155, 156 may be a device configured to provide cloud resources for use by client devices. In various embodiments, each of the cloud devices 131, 132, 133, 144, 155, 156 may be a desktop computer, laptop, tablet, mobile device, server, or blade. As such, the cloud devices 131, 132, 133, 144, 155, 156 may include various hardware such as, for example, storage devices, memory, or one or more processors. The cloud devices 131, 132, 133, 144, 155, 156 may be configured to provide processing, storage, memory, VMs, or groups of VMs for use by client devices such as the client device 110.

In various embodiments, such as the embodiment illustrated in FIG. 1, the cloud controller 120 may interface with an application manager 160 to deploy and subsequently scale a cloud application with demand. The application manager 160 may be, for example, a desktop computer, laptop, tablet, mobile device, server, or blade and may include a virtual machine. The application manager 160 may receive a "recipe file" from the client 110 or cloud controller 120. An application provider may provide the "recipe file" to the client 110 or cloud controller 120. As used herein, the term "recipe file" will be understood to refer to any definition of the components to be deployed for an application. Further, the term "file" will be understood to refer not only to a file as conventionally known, but also any other storage structure suitable for holding such a definition. For example, a recipe file may specify that an application includes front-end web servers and a database server for each front-end web server. Various alternative applications to be defined by a recipe file will be apparent. Upon receiving a recipe file, the application manager 160 may interpret the recipe file and subsequently request that the cloud controller 120 establish the components that make up the application defined in the recipe file. Thereafter, the application manager 160 may monitor the load placed on the various components by customer traffic and request the cloud controller 120 scale up components that are overloaded or scale down components that are underutilized. For example, the application manager 160 may determine that a front-end web server belonging to the application is overloaded and subsequently request that the cloud controller 120 scale up by establishing an additional front-end web server. Various other functions for the application manager 160 will be apparent such as, for example, handling crashed or failing VMs and the subsequent re-deploying of a component previously residing on a crashed or failing VM. In other embodiments, the application manager 160 may be implemented as part of the cloud controller 120.

Upon receiving a request to establish or scale resources or components, the cloud controller 120 may determine an appropriate location for the requested operation using a user-provided "network policy file." As used herein, the term "network policy file" will be understood to refer to any definition of characteristics of network connections between the various components in an application. The network policy file may contain, for example, information relating to what private network a component should be connected to, the IP range for each network, whether the IP network uses static or dynamic allocation, what is the default network in order to determine the default network gateway, etc. For example, a network policy file may specify that a front-end server should be connected to a back-end server with access to a specific database. The policy file may also define various constraints on the network connections such as bandwidth or latency. When establishing network connections between components, the cloud controller 120 may select network connections that are consistent with the various characteristics defined in the network policy file.

Figure 2:
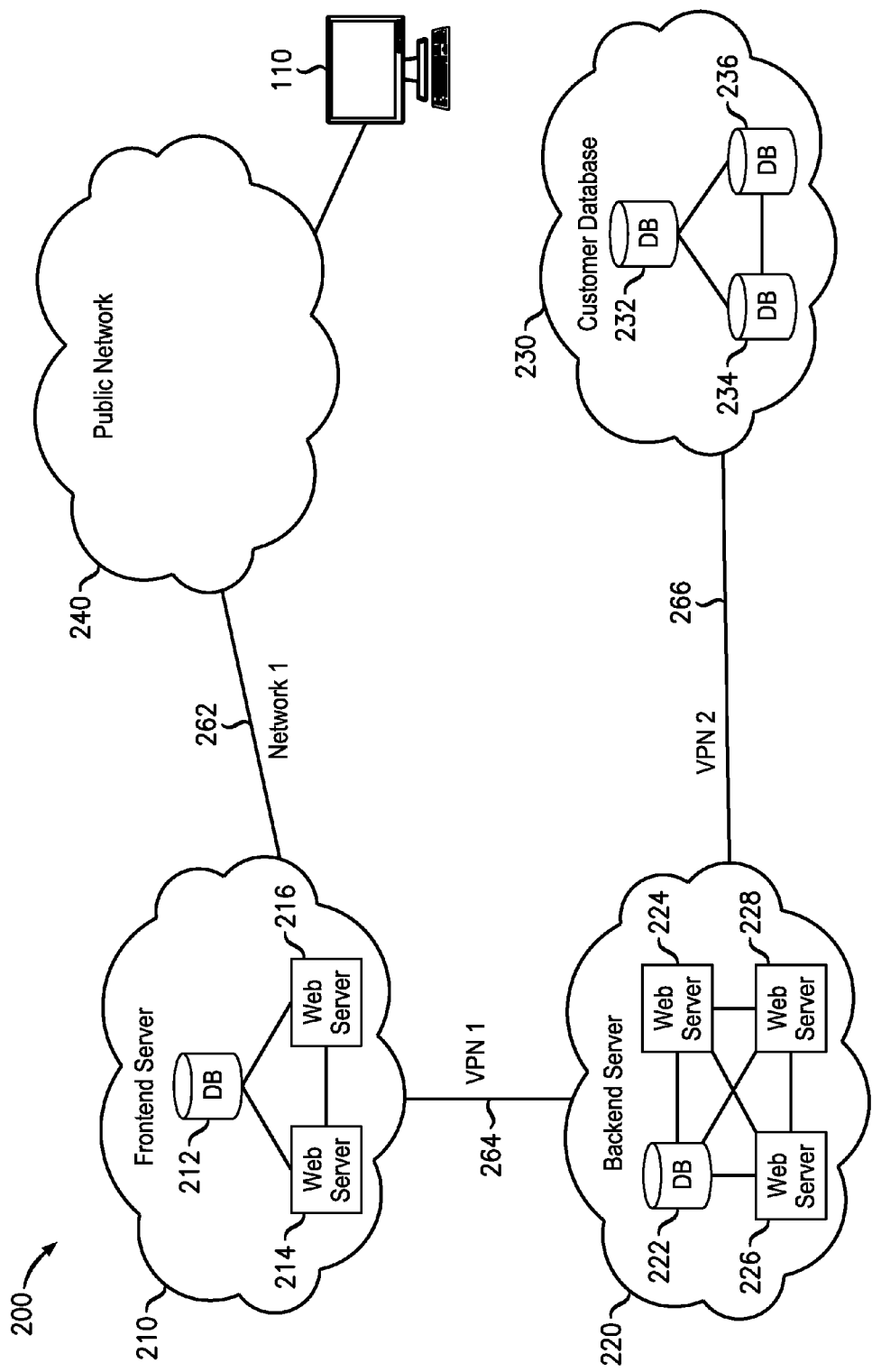
FIG. 2 illustrates an exemplary distributed cloud application.

FIG. 2 illustrates an exemplary distributed cloud application. The distributed application 200 may be implemented in a distributed cloud architecture such as, for example, the cloud architecture 100 of FIG. 1. As illustrated, the exemplary application may include five web-severs 214, 216, 224, 226, 228 and five database servers 212, 222, 232, 234, 236. It will be understood that the various components 212, 214, 216, 222, 224, 226, 228, 232, 234, 236 may not be directly connected to one another, as illustrated, and instead may be in communication via one or more networks of intermediate devices such as, for example, the Internet or virtual private networks (VPNs). Further, the components 212, 214, 216, 222, 224, 226, 228, 232, 234, 236 may represent various virtual machines deployed within a cloud architecture for performing varying functions. The various components may be distributed among three data centers 210, 220, 230, as specified by a user-provided recipe file. For example, the recipe file may call for a front-end server 210, a back-end server 220, and a customer database 230. A client device 110 may be connected to the front-end server 210 via a public network 240 via a network connection 262. Network connections, for example, PubNet 262, VPN 1 264, and VPN 2 266 may be automatically established by an application manager using a network policy file. The application manager may be one of the web servers 214, 216, 224, 226, 228 or some other server or processor in the distributed cloud.

The front-end server 210 may provide a login webpage for a user using a client device 110 to use the cloud application. The front-end server 210 may be connected to the client device 110 via a public network 240 such as the internet over the public network connection Network 1 262. Once the front-end server 210 authenticates the user, a connection may then be made to the back-end server 220 over a network connection VPN 1 264. The back-end server 220 may then connect to the customer database 230 over a network connection VPN 2 266 in order to allow access to information in the customer database 230 needed by the cloud application and the user. This application architecture allows for the customer database 230 to only be accessed by a trusted back-end server 220 via the VPN 2 266. This may prevent direct access to the customer database 230 from a server connected directly to a user over a public network, thus providing greater security for the customer database. Further, the application provider does not have specific details regarding the customer database 230 or the networks VPN 1 or VPN 2, because the application manager selects these private connections based upon the network policy file. Not only does this provide for greater security for private networks, it also may mean that the application manager does not need to track changes to the network resources available to implement an application, but rather the application manager may include such information and use that information to initiate many different applications based upon recipe files from various application providers.

A network policy file may be defined in various formats such as, for example, extensible markup language (XML), a scripting language, a proprietary policy file markup language, or any other language useful in defining network characteristics. Such a network policy file may read, for example, as follows.

PolicyFile.xml

```
<?xml version="1.0"?>
<service>
    <applicationName>WebAppExample</applicationName>
    <tiers>
        <tier name="VPN 1">
            <privateNetworks>
                <defaultNetworkId>20</defaultNetworkId>
                <networks>
                    <network>
                        <networkId>22</networkId>
                        <ipAllocation>static</ipAllocation>
                        <ipRangeStart>10.45.25.1</ipRangeStart>
                        <ipRangeEnd>10.45.25.5</ipRangeEnd>
                    </network>
                    <network>
                        <networkId>20</networkId>
                        <ipAllocation>dynamic</ipAllocation>
                    </network>
                </networks>
            </privateNetworks>
        </tier>
        <tier name="VPN 2">
            <privateNetworks>
                <defaultNetworkId>19</defaultNetworkId>
                <networks>
                    <network>
```

```
                    PolicyFile.xml

<networkId>19</networkId>
                    <ipAllocation>dynamic</ipAllocation>
                </network>
            </networks>
        </privateNetworks>
    </tier>
    <tier name="PubNet">
        <publicNetworks>
            <defaultNetworkId>10</defaultNetworkId>
            <networks>
                <network>
                    <networkId>10</networkId>
                    <ipAllocation>dynamic</ipAllocation>
                </network>
            </networks>
        </publicNetworks>
    </tier>
    </tiers>
</service>
```

As will be understood, the example policy file defines three network tiers: VPN 1, VPN 2, and PubNet. These tier definitions may then be associated with application components to define the network connectivity needed by the application components. VPN 1 may define private networks. The default network ID may be set to 20. Further, a first network ID of 22 is defined as having a static IP allocation with a range of IP address for 10.45.25.1 to 10.45.24.5. Then a second network ID of 20 is defined has having a dynamic IP allocation. VPN 2 may define a private network. The default network ID may be set to 19. Further, a first network ID of 19 is defined as having a dynamic IP allocation. PubNet may define a private network. The default network ID may be set to 10. Further, a first network ID of 10 is defined as having a dynamic IP allocation.

The example policy file may be used to associate tiers with three application components, for example, front-end server 210, back-end server 220, and customer database 230. For example, the front-end server 210 may be defined to have two network connections: a private network VPN 1 and a public network PubNet. The back-end server 220 may be defined to have two network connections: a private network VPN 1 and a private network VPN 2. Finally the customer database 230 may be defined to have one network connection: a private network VPN 2.

It will be understood that various alternative methods for specifying network connections may exist. For example, the network policy file may contain information relating to what private network a component should be connected to, the IP range for each network, whether the IP network uses static or dynamic allocation, what is the default network in order to determine the default network gateway, connection bandwidth, connection latency, etc.

Figure 3:
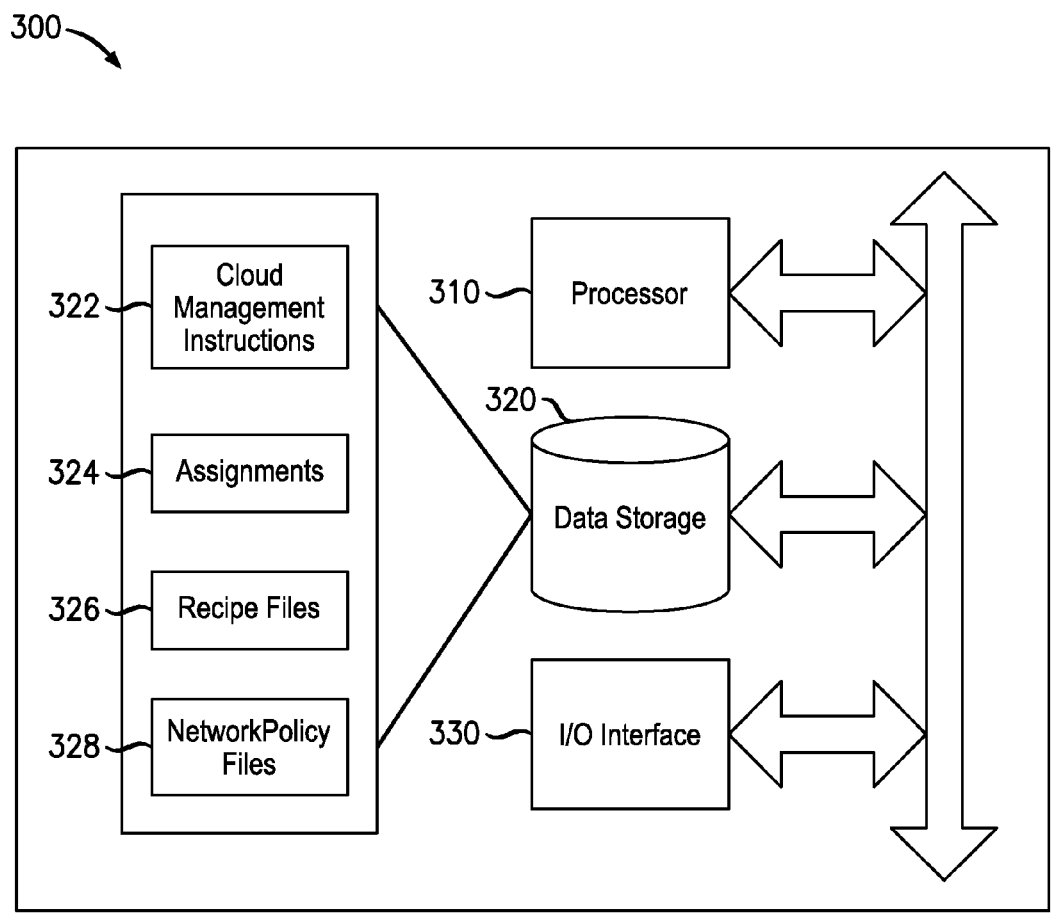
FIG. 3 illustrates an exemplary cloud controller.

FIG. 3 illustrates an exemplary application manager 300. The exemplary application manager 300 may correspond to the application manager 160 of the exemplary cloud architecture 100. The application manager 300 may include a processor 310, a data storage 320, and an input/output (I/O) interface 330.

The processor 310 may control the operation of the application manager 300 and cooperate with the data storage 320 and the I/O interface 330, via a system bus. As used herein, the term "processor" will be understood to encompass a variety of devices such as microprocessors, field-programmable gate arrays (FPGAs), application-specific integrated circuits (ASICs), and other similar processing devices.

The data storage 320 may store program data such as various programs useful in managing resources in a cloud. For example, the data storage 320 may store cloud management instructions 322 for performing one or more methods such as, for example, the method described in connection with FIG. 4 below. The cloud management instructions 322 may include further instructions or methods useful in cooperating with one or more cloud controllers and other application managers and coordinating the operations of various data centers, hypervisors, or virtual machines.

The data storage may also store records of previous assignments 324. In various embodiments, the application manager 300 may also store recipe files 326 and network policy files 328 received from the user for future use.

The I/O interface 330 may cooperate with the processor 310 to support communications over one or more communication channels. For example, the I/O interface 330 may include a user interface, such as a keyboard and monitor, and/or a network interface, such as one or more Ethernet ports.

In some embodiments, the processor 310 may include resources such as processors/CPU cores, the I/O interface 330 may include any suitable network interfaces, or the data storage 320 may include memory or storage devices. Moreover the application manager 300 may be any suitable physical hardware configuration such as: one or more server(s), blades consisting of components such as processor, memory, network interfaces or storage devices. In some of these embodiments, the application manager 300 may include cloud network resources that are remote from each other.

In some embodiments, the application manager 300 may include one or more virtual machines. In some of these embodiments, a virtual machine may include components from different physical machines or be geographically dispersed. For example, the data storage 320 and the processor 310 may reside in two different physical machines.

In some embodiments, the application manager 300 may be a general purpose computer programmed to perform the method 400. Further, the application manager 300 may implement the application manager. Such implementation may include software that defines the application manager running on the application manager 300.

When processor-executable programs are implemented on a processor 310, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

Figure 4:
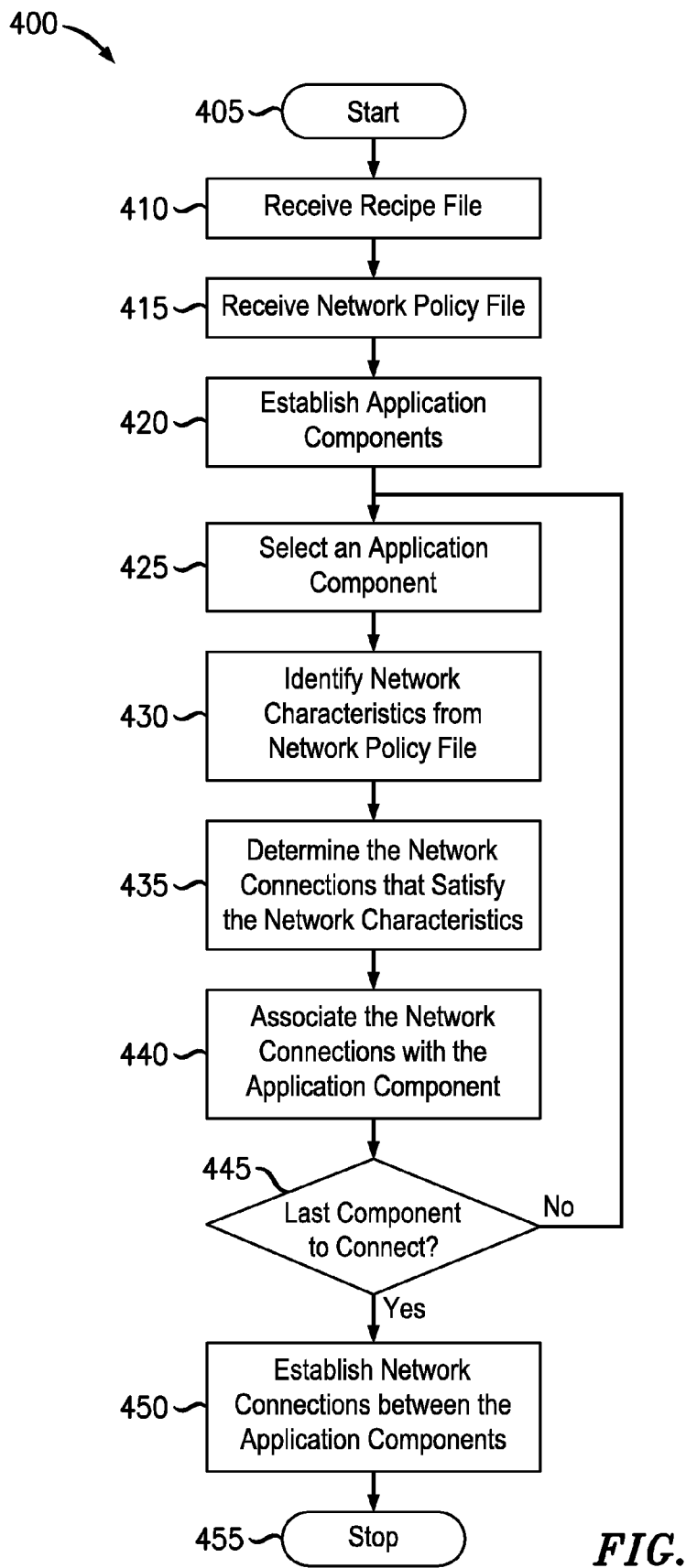
FIG. 4 illustrates an exemplary method for establishing network connections for an application within the distributed cloud.

FIG. 4 illustrates an exemplary method 400 for establishing network connections for an application within the distributed cloud. Method 400 may be performed, for example, by an application manager which application manager may be implemented on a cloud controller such as cloud controller 120 or application manager 160 or 300.

Method 400 may start in step 405 and proceed to step 410 where the application manager 160 may receive a recipe file from an application provider. The recipe file may define a cloud application that the application provider wishes to be established. Next, in step 415, the application manager may receive a network policy file from the application provider. The network policy file may define network characteristics that may be used to determine the network connections needed to automatically interconnect the various application components and to implement the application. An example of such a network policy file is described above. It will be understood that the application manager may receive a file in multiple ways such as, for example, the application provider uploading the file, the application provider creating a file with an application manager-provided GUI, the application provider selecting a file resident at the application manager, or the application provider identifying a file stored elsewhere such as by a URL.

Next, in step 420, application manager may then establish components based on the recipe file. Next, the application manager may, in step 425, select one of the established application components. In step 430, the application manager may identify network characteristics from the network policy file to be applied to the application component. Next, the application manager may determine the network connections that satisfy the network characteristics in step 435. The application manager may use its knowledge of the network connections available to determine the specific network connections needed by the application components as defined in the network policy file. In step 440, the application manager may associate the network connections with the application component.

After associating network connections with the selected application component, the application manager may determine, in step 445, whether additional application components remain to be connected. If additional application components remain to be connected, the method 400 may loop back to step 425. Otherwise, the method 400 may proceed to step 450. In step 450, after all of the application components have been associated with the needed network connections, the application manager may then establish the network connections between the application components. Then the method 400 ends in step 455. In alternative embodiments, the network connections between the components may be established at the time that the network connections are associated with the application components in step 440.

According to the foregoing, various embodiments enable an application provider to request deployment of a distributed cloud application and to provide specification of the needed network connections without the application provider knowing specific information regarding private and other networks needed to implement the cloud application. This allows for a provider of cloud infrastructure to provide an application manager that knows specific information regarding private networks that may be used to implement the distributed could application without revealing that information to an application provider. Accordingly the exposure of sensitive client information is minimized. Further, the application provider does not need to track changes in the network because the application manager maintains information related to the network and available network resources.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be effected while remaining within the spirit and scope of the invention. Accordingly, the foregoing disclosure, description, and figures are for illustrative purposes only and do not in any way limit the invention, which is defined only by the claims.

What is claimed is:

1. A method performed by an application manager for automatically establishing a network connection between components of an application within a distributed cloud, the method comprising:
    establishing application components in the distributed cloud;
    selecting a first application component;
    identifying network characteristics from a network policy file associated with the first application component;
    determining a network connection between the first application component and a second application component according to the network characteristics associated with the first application component;
associating the network connection with the first application component; and
establishing the network connection between the first and second application components.

2. The method of claim 1, further comprising:
receiving the network policy file from an application provider.

3. The method of claim 2, further comprising:
receiving a recipe file from the application provider, wherein the recipe file defines the application components.

4. The method of claim 1, further comprising:
determining that a third application component needs a network connection;
identifying network characteristics from the network policy file associated with the third application component;
determining a network connection between the third application component and a fourth application component according to the network characteristics associated with the third application component;
associating the network connection with the third application component; and
establishing the network connection between the third and fourth application components.

5. The method of claim 1, wherein the connection between the first application component and the second application component is a private network.

6. The method of claim 1, wherein the network policy file includes network information of one of network connection bandwidth, network connection latency, IP allocation type, default network ID, private network identifier, and IP address range.

7. The method of claim 1, wherein the first application component includes a private database and the connection between the first application component and the second application component is a private network.

8. An application manager for automatically establishing a network connection between components of an application within a distributed cloud, the application manager comprising:
a data storage;
a processor in communication with the data storage, the processor being configured to: establish application components in the distributed cloud; select a first application component; identify network characteristics from a network policy file associated with the first application component; determine a network connection between the first application component and a second application component according to the network characteristics associated with the first application component; associate the network connection with the first application component; and establish the network connection between the first and second application components.

9. The application manager of claim 8, wherein the processor is further configured to receive the network policy file from an application provider.

10. The application manager of claim 9, wherein the processor is further configured to receive a recipe file from the application provider, wherein the recipe file defines the application components.

11. The application manager of claim 8, wherein the processor is further configured to: determine that a third application component needs a network connection; identify network characteristics from the network policy file associated with the third application component; determine a network connection between the third application component and a fourth application component according to the network characteristics associated with the third application component; associate the network connection with the third application component; and establish the network connection between the third and fourth application components.

12. The application manager of claim 8, wherein the connection between the first application component and the second application component is a private network.

13. The application manager of claim 8, wherein the network policy file includes network information of one of network connection bandwidth, network connection latency, IP allocation type, default network ID, private network identifier, and IP address range.

14. The application manager of claim 8, wherein the first application component includes a private database and the connection between the first application component and the second application component is a private network.

15. A non-transitory machine-readable storage medium encoded with instructions for execution by an application manager for automatically establishing a network connection between components of an application within a distributed cloud, the medium comprising:
instructions for establishing application components in the distributed cloud;
instructions for selecting a first application component;
instructions for identifying network characteristics from a network policy file associated with the first application component;
instructions for determining a network connection between the first application component and a second application component according to the network characteristics associated with the first application component;
instructions for associating the network connection with the first application component; and
instructions for establishing the network connection between the first and second application components.

16. The non-transitory machine-readable storage medium of claim 15, further comprising:
instructions for receiving the network policy file from an application provider.

17. The non-transitory machine-readable storage medium of claim 16, further comprising:
instructions for receiving a recipe file from the application provider, wherein the recipe file defines the application components.

18. The non-transitory machine-readable storage medium of claim 15, further comprising:
instructions for determining that a third application component needs a network connection;
instructions for identifying network characteristics from the network policy file associated with the third application component;
instructions for determining a network connection between the third application component and a fourth application component according to the network characteristics associated with the third application component;
instructions for associating the network connection with the third application component; and
instructions for establishing the network connection between the third and fourth application components.

19. The non-transitory machine-readable storage medium of claim 15, wherein the network policy file includes network information of one of network connection bandwidth, network connection latency, IP allocation type, default network ID, private network identifier, and IP address range.

20. The non-transitory machine-readable storage medium of claim 15, wherein the first application component includes a private database and the connection between the first application component and the second application component is a private network.

* * * * *